(12) United States Patent
Bryll et al.

(10) Patent No.: US 10,101,572 B2
(45) Date of Patent: Oct. 16, 2018

(54) VARIABLE FOCAL LENGTH LENS SYSTEM WITH MULTI-LEVEL EXTENDED DEPTH OF FIELD IMAGE PROCESSING

(71) Applicant: Mitutoyo Corporation, Kanagawa-ken (JP)

(72) Inventors: Robert Kamil Bryll, Bothell, WA (US); Tatsuya Nagahama, Kawasaki (JP)

(73) Assignee: Mitutoyo Corporation, Kanagawa-Ken (JP)

( * ) Notice: Subject to any disclaimer, the term of this patent is extended or adjusted under 35 U.S.C. 154(b) by 170 days.

(21) Appl. No.: 15/360,579

(22) Filed: Nov. 23, 2016

(65) Prior Publication Data

US 2018/0143419 A1    May 24, 2018

(51) Int. Cl.

| | |
|---|---|
| G02B 21/36 | (2006.01) |
| H04N 5/232 | (2006.01) |
| G06T 5/00 | (2006.01) |
| G02F 1/11 | (2006.01) |
| G02B 21/00 | (2006.01) |

(52) U.S. Cl.
CPC ....... *G02B 21/367* (2013.01); *G02B 21/0016* (2013.01); *G02F 1/113* (2013.01); *G06T 5/003* (2013.01); *H04N 5/23212* (2013.01); *H04N 5/23216* (2013.01)

(58) Field of Classification Search
CPC ... G02B 21/367; G02B 21/0016; G02F 1/113; G06T 5/003; H04N 5/23212; H04N 5/23216
See application file for complete search history.

(56) References Cited

U.S. PATENT DOCUMENTS

| | | |
|---|---|---|
| 6,452,180 B1 | 9/2002 | Nistler et al. |
| 7,324,682 B2 | 1/2008 | Wasserman |
| 7,394,926 B2 | 7/2008 | Bryll et al. |
| 7,454,053 B2 | 11/2008 | Bryll et al. |
| 7,864,996 B2 | 1/2011 | Hemmer et al. |
| 8,111,905 B2 | 2/2012 | Campbell |

(Continued)

OTHER PUBLICATIONS

Bryll, "Multi-Level Image Focus Using a Tunable Lens in a Machine Vision Inspection System," U.S. Appl. No. 14/841,051, filed Aug. 31, 2015, 40 pages.

(Continued)

*Primary Examiner* — Huy T Nguyen
(74) *Attorney, Agent, or Firm* — Seed IP Law Group LLP

(57) ABSTRACT

An imaging system including a tunable acoustic gradient (TAG) lens is associated with a user interface including a live display of an extended depth of field (EDOF) image. The TAG lens is utilized to produce a raw EDOF image, which may include defocus blur (e.g., resulting in part from the periodically modulated optical power variation of the TAG lens). The live EDOF image is repetitively updated in the user interface based on a translation state signal at a current time (e.g., indicating a speed of translation of the workpiece across a field of view of the imaging system, etc.) In response to a current state of the translation state signal, a corresponding type of live EDOF image of the workpiece is displayed in the user interface corresponding to an EDOF image data set that is based on a corresponding level of image processing to remove defocus blur.

20 Claims, 7 Drawing Sheets

(56) References Cited

U.S. PATENT DOCUMENTS

| | | |
|---|---|---|
| 8,111,938 B2 | 2/2012 | Bryll et al. |
| 8,755,579 B2 | 6/2014 | Soenksen |
| 2013/0107002 A1* | 5/2013 | Kikuchi ............... H04N 5/232 348/46 |
| 2014/0368726 A1 | 12/2014 | Gladnick |

OTHER PUBLICATIONS

Bryll et al., "Chromatic Aberration Correction in Imaging System Including Variable Focal Lens," U.S. Appl. No. 14/854,624, filed Sep. 15, 2015, 34 pages.

Gladnick, "Adaptable Operating Frequency of a Variable Focal Length Lens in an Adjustable Magnification Optical System," U.S. Appl. No. 14/795,409, filed Jul. 9, 2015, 36 pages.

Mermillod-Blondin et al., "High-speed varifocal imaging with a tunable acoustic gradient index of refraction lens," *Optics Letters* 33(18):2146-2148, 2008.

Mitutoyo, "QVPAK 3D CNC Vision Measuring machine," Operation Guide Version 2.0, Sep. 1996, 86 pages.

Mitutoyo, "QVPAK 3D CNC Vision Measuring Machine," User's Guide, Version 7, Jan. 2003, 329 pages.

Nagahara et al., "Flexible Depth of Field Photography," *Computer Vision—ECCV 2008* 5305:60-73, 2008.

* cited by examiner

VARIABLE FOCAL LENGTH LENS SYSTEM WITH MULTI-LEVEL EXTENDED DEPTH OF FIELD IMAGE PROCESSING

BACKGROUND

Technical Field

This disclosure relates generally to precision metrology using a variable focus lens, and more particularly to extended depth-of-field imaging operations such as may be utilized in machine vision inspection or other vision systems.

Description of the Related Art

Precision machine vision inspection systems (or "vision systems" for short) are used to obtain precise dimensional measurements of objects and to inspect various other object characteristics. Such systems may include a computer, a camera and optical system, and a precision stage that moves to allow workpiece traversal and inspection. One exemplary prior art system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system uses a microscope-type optical system and moves the stage so as to provide inspection images of either small or relatively large workpieces at various magnifications.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as autofocus video tools.

Video tools (or "tools" for short) and other graphical user interface features may be used manually to accomplish manual inspection and/or machine control operations (in "manual mode"). Their setup parameters and operation can also be recorded during learn mode, in order to create automatic inspection programs, or "part programs." Video tools may include, for example, edge-/boundary-detection tools, autofocus tools, shape- or pattern-matching tools, dimension-measuring tools, and the like.

In some applications, it is desirable to operate an imaging system of a machine vision inspection system to collect an image with an extended depth of field (EDOF), such that the depth of field is larger than that provided by the optical imaging system at a single focus position. Various methods are known for collecting an image with an extended depth of field. One such method is to collect an image "stack," consisting of a plurality of congruent or aligned images focused at different distances throughout a focus range. A mosaic image of the field of view is constructed from the image stack, wherein each portion of the field of view is extracted from the particular image that shows that portion with the best focus. However, this method is relatively slow. As another example, Nagahara et al. ("Flexible Depth of Field Photography," Proceedings of the European Conference on Computer Vision, October 2008) discloses a method wherein a single image is exposed along a plurality of focus distances during its exposure time. This image is relatively blurry, but contains image information acquired over the plurality of focus distances. It is deconvolved using a known or predetermined blur kernel to obtain a relatively clear image with an extended depth of field. In the method described in Nagahara, the focal distance is altered by translating the image detector along an optical axis of an imaging system. As a result, different focal planes are focused on the detector at different times during exposure. However, such a method is relatively slow and mechanically complex, which can cause issues for certain types of applications (e.g., when displaying a live EDOF image of a workpiece that is being moved across a field of view, for which the processing may be too slow to keep up with the motion, etc.) An improved method for providing EDOF images (e.g., such as may be performed when providing live EDOF images, etc.) is desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method are provided in which a live extended depth of field (EDOF) image of a workpiece is displayed in a user interface (UI) associated with an imaging system, wherein the workpiece may translate across a field of view of the imaging system. The imaging system includes a lens system, a control system, a camera, and an image processing portion. The lens system includes a tunable acoustic gradient (TAG) lens that is controlled to provide a periodically modulated optical power variation for the TAG lens and thereby provide a corresponding focus distance variation for the imaging system. The control system includes a lens controller configured to control the TAG lens. The camera is configured to input workpiece image light from the lens system at a plurality of focus distances for the imaging system and to output a corresponding raw EDOF image data set corresponding to a raw EDOF image. The image processing portion is configured to input a raw EDOF image data set and process it to provide a processed EDOF image data set that is based on image processing to remove defocus blur in a corresponding displayed EDOF image.

In various implementations, the camera is operated to output a sequence of the raw EDOF image data sets over time, corresponding to a sequence of raw EDOF images of the workpiece over time. A translation state signal is repetitively determined corresponding to a current translation speed of the workpiece across a field of view of the imaging system at a current time. The live EDOF image of the workpiece displayed in the user interface is repetitively updated based on the state of the translation state signal at a current time, for which different types of images are displayed depending on the state of the translation state signal. More specifically, in response to a first translation state signal corresponding to a first current translation speed (e.g., a relatively slower speed), a first type of live EDOF image of the workpiece is displayed in the user interface corresponding to an EDOF image data set that is based on a first level of image processing (e.g., a relatively high amount of image processing) to remove defocus blur in the first type of live EDOF image. In response to a second translation state signal corresponding to a second current translation speed that is faster than the first current translation speed, a second type of live EDOF image of the workpiece is displayed in the user interface. In various implementations, the second type of live EDOF image corresponds to an EDOF image data set that is based on at least one of: a second level of image processing to remove defocus blur in the second type of live EDOF image, wherein the second level of image processing corresponds to less image processing than the first level of image processing; or no image processing to remove defocus blur in the second type of live EDOF image.

DETAILED DESCRIPTION

Figure 1:
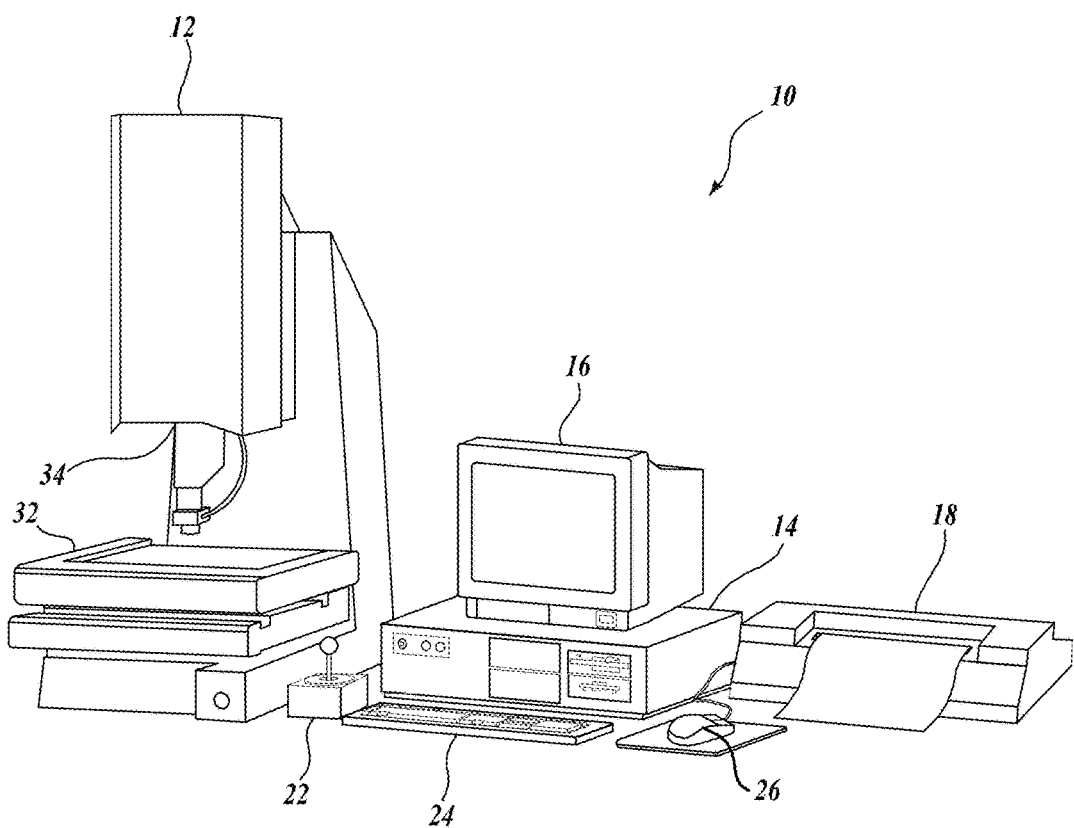
FIG. 1 is a diagram showing various typical components of a general-purpose precision machine vision inspection system.

FIG. 1 is a block diagram of one exemplary machine vision inspection system 10 which includes an imaging system usable in accordance with principles disclosed herein. The vision system 10 includes a vision measuring machine 12 operably connected to exchange data and control signals with a controlling computer system 14, a monitor or display 16, a printer 18, a joystick 22, a keyboard 24, and a mouse 26. The monitor or display 16 may display a user interface for controlling and/or programming the vision system 10. A touchscreen tablet or the like may be substituted for or augment any or all of these components.

More generally, the controlling computer system 14 may comprise or consist of any computing system or device, and/or distributed computing environment, and may include one or more processors that execute software to perform the functions described herein. Processors include programmable general- or special-purpose microprocessors, controllers, application-specific integrated circuits (ASICs), programmable logic devices (PLDs), or a combination thereof. Software may be stored in random-access memory (RAM), read-only memory (ROM), flash memory, or the like, or a combination thereof. Software may also be stored in optical-based disks, flash memory devices, or any other type of non-volatile storage medium for storing data. Software may include one or more program modules that include routines, programs, objects, components, data structures, and so on that perform particular tasks or implement particular abstract data types. The functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications (e.g., 0.5× to 100×). Similar vision systems are described in commonly assigned U.S. Pat. Nos. 7,324,682; 7,454,053; 8,111,905; and 8,111,938, each of which is hereby incorporated herein by reference in its entirety.

Figure 2:
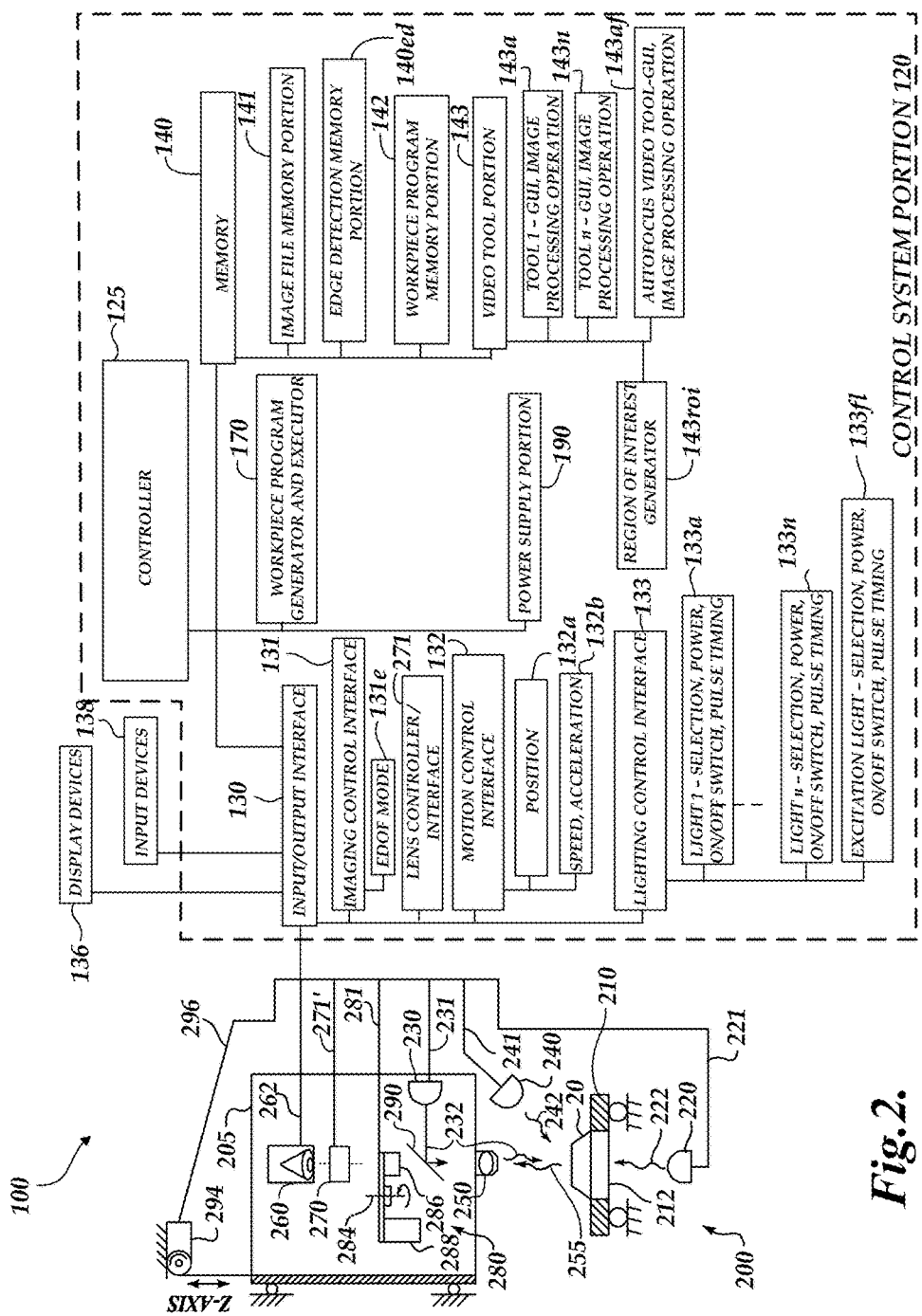
FIG. 2 is a block diagram of a control system portion and a vision components portion of a vision system similar to that of FIG. 1 and including features disclosed herein.

FIG. 2 is a block diagram of a control system portion 120 and a vision components portion 200 of a vision system 100 similar to the vision system of FIG. 1, including features as described herein. Similar to the vision system of FIG. 1, the vision system 100 includes an imaging system usable in accordance with various principles disclosed herein, as will be described in more detail below with respect to FIG. 3. In the example of FIG. 2, the control system portion 120 is utilized to control the vision components portion 200. The vision components portion 200 includes an optical assembly portion 205, light sources 220, 230 and 240, and a workpiece stage 210 that may have a central transparent portion 212. The workpiece stage 210 is controllably movable along x- and y-axes that lie in a plane that is generally parallel to the surface of the stage where a workpiece 20 may be positioned.

The optical assembly portion 205 may include a camera system 260 (e.g., including a camera, a confocal optical detector, etc.), a variable focal length (VFL) lens 270, and may also include an interchangeable objective lens 250 and a turret lens assembly 280 having lenses 286 and 288. Alternatively to the turret lens assembly, a fixed or manually interchangeable magnification-altering lens, or a zoom lens configuration, or the like, may be included. In various implementations, the various lenses may be included as part of a variable magnification lens portion of the optical assembly portion 205. In various implementations, the interchangeable objective lens 250 may be selected from a set of fixed magnification objective lenses (e.g., a set ranging from 0.5× to 100×, etc.)

In various implementations, the optical assembly portion 205 is controllably movable along a z-axis that is generally orthogonal to the x- and y-axes by using a controllable motor 294 that drives an actuator to move the optical assembly portion 205 along the z-axis to change the focus of an image. The controllable motor 294 is connected to an input/output interface 130 via a signal line 296. As will be described in more detail below, the VFL lens 270 may also be operated to periodically modulate a focus position. A workpiece 20, or plurality of workpieces 20, to be imaged is/are on the workpiece stage 210 which moves (e.g., in the x- and y-axes directions) relative to the optical assembly portion 205, such that the imaged area moves between locations on the workpiece(s) 20, and such that the workpiece(s) 20 may translate across a field of view of the imaging system.

One or more of a stage light 220, a coaxial light 230, and a surface light 240 (e.g., a ring light) may emit source light 222, 232, and/or 242, respectively, to illuminate the workpiece or workpieces 20. The coaxial light 230 may emit light 232 along a path including a mirror 290. The source light is reflected or transmitted as workpiece light 255, and the workpiece light (e.g., as used for imaging) passes through the interchangeable objective lens 250, the turret lens assembly 280 and the VFL lens 270 and is gathered by the camera system 260 (e.g., including a camera, a confocal optical detector, etc.) In various implementations, the camera system 260 inputs the workpiece light and outputs signal data (e.g., one or more images of the workpiece(s) 20, a confocal brightness signal, etc.) on a signal line 262 to the control system portion 120. The light sources 220, 230, and 240 may be connected to the control system portion 120 through signal lines or busses 221, 231, and 241, respectively. The control system portion 120 may rotate the turret lens assembly 280 along axis 284 to select a turret lens through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, and additional components described below, may be interconnected by one or more data/control busses and/or application programming interfaces, or by direct connections between the various elements. The input/output interface 130 includes an imaging control interface 131, a motion control interface 132, a lighting control interface 133, and a lens controller/interface 271. The motion control interface 132 may include a position control element 132a, and a speed/acceleration control element 132b, although such elements may be merged and/or indistinguishable. The lighting control interface 133 may include lighting control elements 133a, 133n, and 133fl that control, for example, the selection, power, on/off switch, and strobe pulse timing, if applicable, for the various corresponding light sources of the vision system 100.

The imaging control interface 131 may include an extended depth of field (EDOF) mode 131e, which may be selected (e.g., by a user, automatically, etc.) to collect at least one image of a workpiece with a depth of field that is greater than what may be provided by the vision components portion 200 when focused at a single focus position. The lens controller/interface 271 may comprise an EDOF lens controller including a lens focus driving circuit and/or routine, or the like. In accordance with the principles disclosed herein, in one implementation, the lens controller/interface 271 may be configured or controlled by a user and/or an operating program, and may utilize a signal line 271' to control the VFL lens 270 to periodically modulate its optical power (e.g., sinusoidally) and thereby periodically modulate a focus position of the imaging system over a plurality of focus positions along a Z-height direction at a determined operating frequency. The periodically modulated VFL lens optical power defines a periodic focus modulation, which corresponds to a focus distance variation for the imaging system.

Certain operations and components associated with an extended depth of field mode and an EDOF lens control interface and/or controller are also described in copending and commonly assigned U.S. Patent Publication No. 2015/0145980, which is hereby incorporated herein by reference in its entirety. Other systems and methods including VFL lenses are described in copending and commonly assigned U.S. patent application Ser. No. 14/795,409, titled "Adaptable Operating Frequency of a Variable Focal Length Lens in an Adjustable Magnification Optical System," filed on Jul. 9, 2015, U.S. patent application Ser. No. 14/841,051, entitled "Multi-Level Image Focus Using a Tunable Lens in a Machine Vision Inspection System," filed on Aug. 31, 2015, U.S. patent application Ser. No. 14/854,624, entitled "Chromatic Aberration Correction in Imaging System Including Variable Focal Length Lens," filed on Sep. 15, 2015, and U.S. patent application Ser. No. 15/145,682, entitled "Phase Difference Calibration In A Variable Focal Length Lens System," filed on May 3, 2016, each of which is hereby incorporated herein by reference in its entirety.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for autofocus operations. The autofocus video tool 143af may additionally include a high-speed focus height tool that may be utilized to measure focus heights with high speed, as described in more detail in copending and commonly assigned U.S. Patent Publication No. 2014/0368726, which is hereby incorporated herein by reference in its entirety. In various implementations, various components and/or features described herein may be utilized in conjunction with, or otherwise included in, one or more of the video tools (e.g., the autofocus video tool 143af, a separate video tool, etc.)

In the context of this disclosure, and as is known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool, with the underlying operations being included implicitly.

The signal lines or busses 221, 231, and 241 of the stage light 220, the coaxial light 230, and the surface light 240, respectively, are all connected to the input/output interface 130. The signal line 262 from the camera system 260, the signal line 271' from the VFL lens 270, and the signal line 296 from the controllable motor 294 are connected to the input/output interface 130. In addition to carrying image data, the signal line 262 may carry a signal from the controller 125 that initiates certain processes (e.g., image acquisition, confocal brightness measurement, etc.)

Display devices 136 (e.g., the display 16 of FIG. 1) and input devices 138 (e.g., the joystick 22, keyboard 24, and mouse 26 of FIG. 1) may also be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision system components portion 200. The display devices 136 may display user interface features (e.g., as associated with the imaging control interface 131, the EDOF mode 131e, the lens controller/interface 271, the motion control interface 132, the autofocus video tool 143af, etc.)

In various exemplary implementations, when a user utilizes the vision system 100 to create a part program for the workpiece 20, the user generates part program instructions by operating the vision system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one or more of the video tools on that workpiece feature). The sequence(s) are captured or recorded or converted to corresponding part program instructions. When the part program is executed, it will cause the vision system to reproduce the trained image acquisition and automatically inspect a current workpiece (e.g., a run mode workpiece), or workpieces, which is similar to the representative workpiece used when creating the part program (e.g., during a learn mode). The systems and methods disclosed herein with respect to the EDOF mode 131e are particularly useful during such learn mode and/or manual operations, in that a user may see a video sequence of live EDOF images (e.g., at least approximately in real time) while navigating a workpiece for visual inspection and/or workpiece program creation. The user need not continually refocus high-magnification images depending on the height of various microscopic features on the workpiece, which can be tedious and time-consuming, especially at high magnifications.

Figure 3:
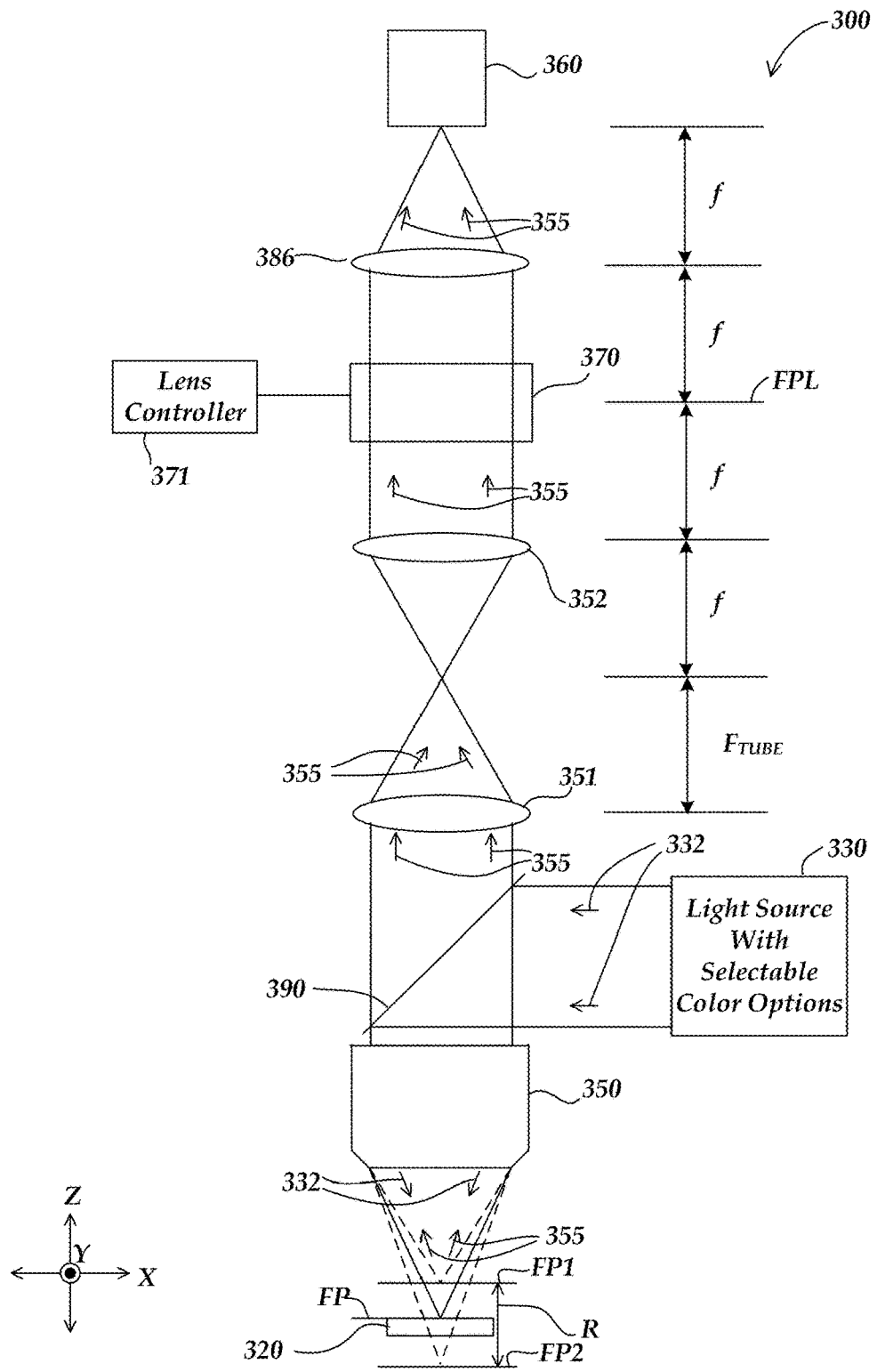
FIG. 3 is a schematic diagram of an imaging system that may be operated according to principles disclosed herein.

FIG. 3 is a schematic diagram of an imaging system 300 that may be adapted to a vision system and operated according to the principles disclosed herein. It will be appreciated that certain numbered components 3XX of FIG. 3 may correspond to and/or have similar operations as similarly numbered components 2XX of FIG. 2, except as otherwise described below. In various implementations, the imaging system 300 is configurable to provide at least one EDOF image of a workpiece that has a larger depth of field than the imaging system in a single focal position (e.g., 10-20 times larger, or more, in various implementations). As shown in FIG. 3, the imaging system 300 includes a light source 330 that is configurable to illuminate a workpiece 320 (e.g., with strobed or continuous-wave illumination) in a field of view of the imaging system 300, an objective lens 350, a tube lens 351, a relay lens 352, a variable focal length lens (VFL) 370, a relay lens 386, and a camera system 360.

In operation, the light source 330 is configurable to emit source light 332 along a path including a partial mirror 390 and through the objective lens 350 to a surface of a workpiece 320, wherein the objective lens 350 receives workpiece light 355 that is focused at a focus position FP proximate to the workpiece 320, and outputs the workpiece light 355 to the tube lens 351. In various implementations, the objective lens 350 may be an interchangeable objective lens and the tube lens 351 may be included as part of a turret lens assembly (e.g., similar to the interchangeable objective lens 250 and the turret lens assembly 280 of FIG. 2). In various implementations, the objective lens 350, tube lens 351, or any of the other lenses referenced herein may be formed from or operate in conjunction with individual lenses, compound lenses, etc. The tube lens 351 receives the workpiece light 355 and outputs it to the relay lens 352.

The relay lens 352 receives the workpiece light 355 and outputs it to the VFL lens 370. The VFL lens 370 receives the workpiece light 355 and outputs it to the relay lens 386. The relay lens 386 receives the workpiece light 355 and outputs it to the camera system 360. In various implementations, the camera system 360 may capture an image of the workpiece 320 during an image exposure period, and may provide the image to a control system portion (e.g., similar to the operation of the camera system 260 for providing an image to the control system portion 120 in FIG. 2). In various implementations, the imaging system may further include an optical filter (e.g., located before or as part of the camera system 360) to receive and spatially filter preliminary image light from the VFL lens and to output resulting filtered image light as part of providing an EDOF image.

The VFL lens 370 is electronically controllable to vary the focus position FP of the imaging system during one or more image exposures. The focus position FP may be moved within a range R bound by a focus position FP1 and a focus position FP2. It will be appreciated that in various implementations, the range R may be selected by a user (e.g., in the EDOF mode 131e of the imaging control interface 131, etc.) or may result from design parameters or may otherwise be automatically determined. In general with respect to the example of FIG. 3, it will be appreciated that certain of the illustrated dimensions may not be to scale. For example, the VFL lens 370 may have different proportional dimensions than those illustrated (e.g., may be less wide and up to 50 mm long or longer for certain applications in order to provide a desired amount of lensing power, etc.)

In various implementations, a machine vision inspection system may comprise a control system (e.g., the control system portion 120 of FIG. 2) that is configurable to operate in conjunction with a lens controller 371 or to otherwise control the VFL lens 370 to periodically modulate a focus position of the imaging system 300. In some implementations, the VFL lens 370 may very rapidly adjust or modulate the focus position (e.g., periodically, at a rate of at least 300 Hz, or 3 kHz, or 70 kHz, or much higher). In one example implementation, the range R may be approximately 10 mm (e.g., for a 1× objective lens 350). In various implementations, the VFL lens 370 is advantageously chosen such that it does not require any macroscopic mechanical adjustments in the imaging system and/or adjustment of the distance between the objective lens 350 and the workpiece 320 in order to change the focus position FP. In such a case, in accordance with the principles disclosed herein, an EDOF image may be acquired, and furthermore there are no macroscopic adjustment elements or associated positioning non-repeatability to degrade accuracy when the same imaging system is used for acquiring fixed focus inspection images, which may be used for precision measurements (e.g., for accuracies on the order of a few micrometers) and the like. For example, in some embodiments it is desirable to use the live EDOF image as a display image for a user, and later terminate the periodic modulating of the focus position (e.g., using the previously described EDOF mode control element 131e, or automatic termination based on an active measurement operation, or strobed illumination synchronized with the VFL lens frequency, or the like) to provide a fixed focus position for the imaging system. Then the system may be used to expose a measurement image of a particular feature using the imaging system with the fixed focus position, for which the resulting stable high-resolution measurement image may be processed to provide an accurate measurement of the workpiece. As described in the previously incorporated 726 publication, the changes in the focus position FP may also be utilized to rapidly acquire an image stack including a plurality of images at a plurality of positions along a Z-height direction proximate to the workpiece 320.

In various implementations, the VFL lens 370 may be a tunable acoustic gradient index of refraction ("TAG") lens. A tunable acoustic gradient index of refraction lens is a high-speed VFL lens that uses sound waves in a fluid medium to modulate a focus position, and may periodically sweep a range of focal lengths at a frequency of several hundred kHz. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 KHz.

In various implementations, as described in more detail in the previously incorporated '726 publication, the camera system 360 may comprise a sensor with a global shutter, i.e., a sensor that exposes each pixel simultaneously. Such an embodiment is advantageous in that it provides the capability to measure image stacks without motion of a workpiece or any part of the imaging system 300. In various alternative implementations, the camera system 360 may comprise a sensor with an electronic rolling shutter (ERS) system. For example, the camera system may comprise a black and white CMOS sensor using SXGA resolution coupled with an electronic rolling shutter (ERS) system (e.g., model MT9M001 from Aptina Imaging of San Jose, Calif.).

The VFL lens 370 may be driven by the lens controller 371, which may generate a signal to operate the VFL lens 370. In one embodiment, the lens controller 371 may be a commercial controllable signal generator. In some implementations, the lens controller 371 may be configured or controlled by a user and/or an operating program through the imaging control interface 131, the lens control interface 271 and/or the user interface of the EDOF mode 131e, as outlined previously with respect to FIG. 2. In some implementations, the VFL lens 370 may be operated using a periodic signal such that the focus position FP is modulated sinusoidally over time, at a high frequency. For example, in some exemplary implementations, a TAG lens may be configured for focal scanning rates as high as 400 kHz, although it should be appreciated that slower focus position adjustments and/or modulation frequencies may be desirable in various implementations and/or applications. For example, in various implementations a periodic modulation of 300 Hz, or 3 kHz, or 70 kHz, or 250 kHz, or the like may be used. In implementations where slower focus position adjustments are used, the VFL lens 370 may comprise a controllable fluid lens, or the like.

In various implementations, the TAG lens 370 may be controlled to provide a periodically modulated optical power variation at a frequency of at least 3 KHz, and the camera 360 may be configured to input workpiece image light from the lens system at a plurality of focus distances for the imaging system, during an exposure period spanning a plurality of periods of the periodically modulated optical power variation, for producing an EDOF image. In one such implementation, the plurality of focus distances may be configured to span at least 70% of a maximum focus range of the imaging system according to the periodically modulated optical power variation. In various implementations, the focus distance/position FP may be periodically modulated over a plurality of focus distances spanning at least 20 times the depth of field of the imaging system at a single focus distance. In various implementations, when producing an EDOF image, the light source 330 may be utilized for providing illumination having an intensity variation synchronized with the periodically modulated focus distance/position FP, such that the illumination differently influences the respective exposure contributions for different respective focus distances within a range R of the periodically modulated focus distance.

In the example of FIG. 3, the relay lenses 352 and 386 and the VFL lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance FTUBE of the tube lens 351 is illustrated as being approximately equidistant to a midpoint between the lenses 351 and 352, as is a focal distance f of the relay lens 352. In alternative implementations, the focal distance FTUBE for the tube lens 351 may be made to be different than the focal distance f of the relay lens 352 (which corresponds to one of the 4 f's of the 4f optical configuration). In various implementations where the tube lens 351 may be included as part of a turret lens assembly, it may be desirable for other tube lenses of the turret lens assembly when rotated into the operational position to have a focal point at the same location (i.e., so as to meet the focal point of the relay lens 352).

As described in more detail in the previously incorporated '409 application, the ratio of the focal distance FTUBE to the focal distance f can be utilized to alter the diameter of the collimated beam of workpiece light 355 out of the relay lens 352 relative to the collimated beam of the workpiece light 355 that is input to the tube lens 351. It will be appreciated with respect to the collimated beams of workpiece light 355 that are respectively input to the tube lens 351 and output from the relay lens 352, that in various implementations such collimated beams may be extended into longer path lengths and/or beam splitters may be utilized with respect to such collimated beams for providing additional optical paths (e.g., as directed to different camera systems, etc.).

In various implementations, the illustrated 4f optical configuration permits placing the VFL lens 370 (e.g., which may be a low numerical aperture (NA) device, such as a tunable acoustic gradient index of refraction lens), at the Fourier plane FPL of the objective lens 350. This configuration may maintain the telecentricity at the workpiece 320 and may minimize scale change and image distortion (e.g., including providing constant magnification for each Z-height of the workpiece 320 and/or focus position FP). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL lens, so as to minimize image aberrations, etc.

It will be appreciated that in various implementations, certain types of dimensional measurements may require near-diffraction or diffraction-limited imaging. The configuration illustrated in FIG. 3 reduces aberrations by restricting the off-axis extent of the pupil of the objective lens 350 that is imaged into the VFL lens 370. In this configuration, the radial extent may be maintained to be less than the radial extent of the 1st Bessel ring in the refractive index profile of the standing wave of the VFL lens 370 (e.g., a tunable acoustic gradient index of refraction lens) at its lowest resonant frequency fR,MIN, as described in more detail in the previously incorporated '409 application. In this manner, light from the microscope configuration (i.e., including the objective lens 350 and the tube lens 351) does not exceed the largest clear aperture CAVFL,MAX of the VFL lens 370. In an implementation where the light did exceed the largest clear aperture, the light could interact with the region of the standing wave of the VFL lens 370 that may have an undesirable refractive index which could increase aberrations and reduce dimensional measurement precision.

With respect to the operations of the imaging system shown in FIG. 3, in various implementations associated signal processing may be configured to perform computational deconvolution of a raw (e.g., preliminary) EDOF image and provide a relatively clear live EDOF image (e.g., approximately in real time). For example, a control system (e.g., the control system portion 120 shown in FIG. 2) is configured to collect a first raw EDOF image during the course of at least one sweep of the modulated focus position throughout an EDOF focus range during the image exposure, and process the first raw EDOF image, which may be blurry, to determine a relatively clear EDOF image. In one embodiment, the raw EDOF image may be processed or deconvolved using a known or predetermined integrated point spread function (IPSF) corresponding to the focus range of the raw EDOF image and which is intended to characterize operation of the lens system. A point spread function P(FP) characterizes a blur circle (i.e., a circular image of a point light source at a given distance from an imaging system as a function of a radius r of the blur circle and the focus position FP). A point spread function may be determined experimentally for an imaging system or it may be estimated using point spread functions modeled on functions such as a pill box or a Gaussian curve, or using basic diffraction principles (e.g., Fourier optics), according to known methods. Such point spread functions at various focus distances within a focus range may be weighted according to their expected exposure contributions or applicability. For example, when the focus distance moves during an exposure, each focus distance will contribute to an image exposure for a corresponding time period within that exposure, and a point spread function corresponding to that distance may be weighted accordingly. Such weighted point spread function contributions may be summed or integrated over an expected focus range R. Alternatively, when the focus distance change is a known function of time, such point spread function contributions may be integrated over a period of time corresponding to a sweep of the expected focus range R, analogous to the approach indicated with reference to EQUATION 3 below.

For an imaging system with a modulated focus position, an integrated point spread function h may follow the relation:

$$h = \int_0^T P(FP(t)) dt \qquad \text{Eq. 1}$$

where P(FP(t)) is a point spread function and FP(t) is the time-dependent focal position. A focus position of an imaging system of a machine vision inspection system may be modulated as a function of time t, over a total integration time T, corresponding to an image exposure or integration time of the first raw EDOF image.

Deconvolution of the first raw EDOF image may be understood as an inverse operation that deconvolves a high depth of field image exposed over a range of focus positions having respective durations in the exposure, from an integrated point spread function h, which in some applications may be referred to as a "blur function." The first raw EDOF image may be represented as a two-dimensional function g(x,y) which is a convolution of a sharp (ideal) extended depth of field image f(x,y) (corresponding to an image array with dimensions m×n) with the integrated point spread function h by the equation:

$$g(x, y) = f * h = \sum_m \sum_n f(m, n) h(x-m, y-n) \qquad \text{Eq. 2}$$

In the frequency domain, this convolution may be represented by the product of the Fourier transforms of f and h, represented as F and H:

$$G = F \cdot H \qquad \text{Eq. 3}$$

The Fourier transforms of f and h may be determined efficiently using a fast Fourier transform (FFT) algorithm. The EDOF image (in the frequency domain) may be determined by processing the image G (i.e., multiplying it) by an inverse of H denoted here as $H_r$. The inverse $H_r$ may be computed by several known methods. For example, a simple pseudo inverse of H may be determined by the equation:

$$H_r = \frac{H^*}{|H|^2 + k} \qquad \text{Eq. 4}$$

Where H* is the complex conjugate of the H, and k is a real number chosen empirically based on characteristics of the imaging system 300. In one exemplary embodiment, k is 0.0001. Finally, the extended depth of field image f may be computed as:

$$f(x, y) = g * h_r = \mathcal{F}^{-1}(G \cdot H_r) = \mathcal{F}^{-1}\left\{G \cdot \frac{H^*}{|H|^2 + k}\right\} \qquad \text{Eq. 5}$$

A more robust alternative to the pseudo inverse may be computed according to a Wiener Deconvolution, a Lucy-Richardson iterative algorithm, a Van Cittert iterative algorithm, or other known deconvolution approaches, some of which are described for example in *Digital Image Processing* by Kenneth R. Castleman (Prentice-Hall, Inc., 1996). Additionally, processing the image may comprise noise reduction, for example using an edge-preserving noise reduction filter such as guided filter or bilateral filter. In a different embodiment, as described in greater detail in the previously incorporated '980 publication, a deconvolution may be performed optically using a passive optical filter placed in a Fourier plane of an imaging system according to basic methods of Fourier optics, in order to provide a relatively clear EDOF image in real time.

In exemplary embodiments, the imaging system 300 may provide a raw EDOF image, which is a blurred image including information acquired throughout a desired focus range during its exposure. The raw EDOF image may then be computationally processed as outlined above to provide a processed EDOF image that comprises a depth of field that is larger than the imaging system 300 may provide at a single focal position (e.g., 100 times larger). For example, at a single focal position, the depth of field of the imaging system 300 may be 90 um and an extended depth of field image provided using the same embodiment of the imaging system 300 may have a depth of field as large as 9 mm.

While the above described examples of image processing (e.g., including computational processing including deconvolution, etc.) are effective for providing relatively clear live EDOF images (e.g., in approximately real time), the image processing takes time to perform. The amount of time required for the image processing may cause issues for certain types of applications (e.g., when attempting to display a video-type sequence of live EDOF images of a workpiece on a stage that is being moved across a field of view, for which the processing may be too slow to keep up with a desired frame rate relative to the motion, etc.) As will be described in more detail below, in accordance with principles disclosed herein, when relatively fast motion occurs (e.g., in excess of a designated speed-related threshold), reduced processing may be utilized for providing live EDOF images more quickly, although at a reduced resolution. For example, as described above with respect to EQUATION 2, the function may correspond to an image array with dimensions m×n (e.g., where m and n may represent rows and columns of pixels). If the number of pixels to be processed is reduced, the amount of time required for the overall processing of the raw EDOF image may also be reduced. In one implementation, the number of pixels to be processed may be reduced by averaging or otherwise combining the data from groups of pixels together (e.g., in multi-pixel kernels), wherein the data from a combined group in a multi-pixel kernel may be processed in a similar manner as a single pixel. As a specific example, if an array of 640×480 pixels has the data combined for square groups of 4 pixels (e.g., each group of 4 pixels corresponding to a single multi-pixel kernel), the resulting array to be processed would be 320×240 kernels. As another example, when a speed threshold is exceeded, a raw EDOF image may be utilized without performing any image processing (e.g., no deconvolution processing) to remove defocus blur.

Figure 4:
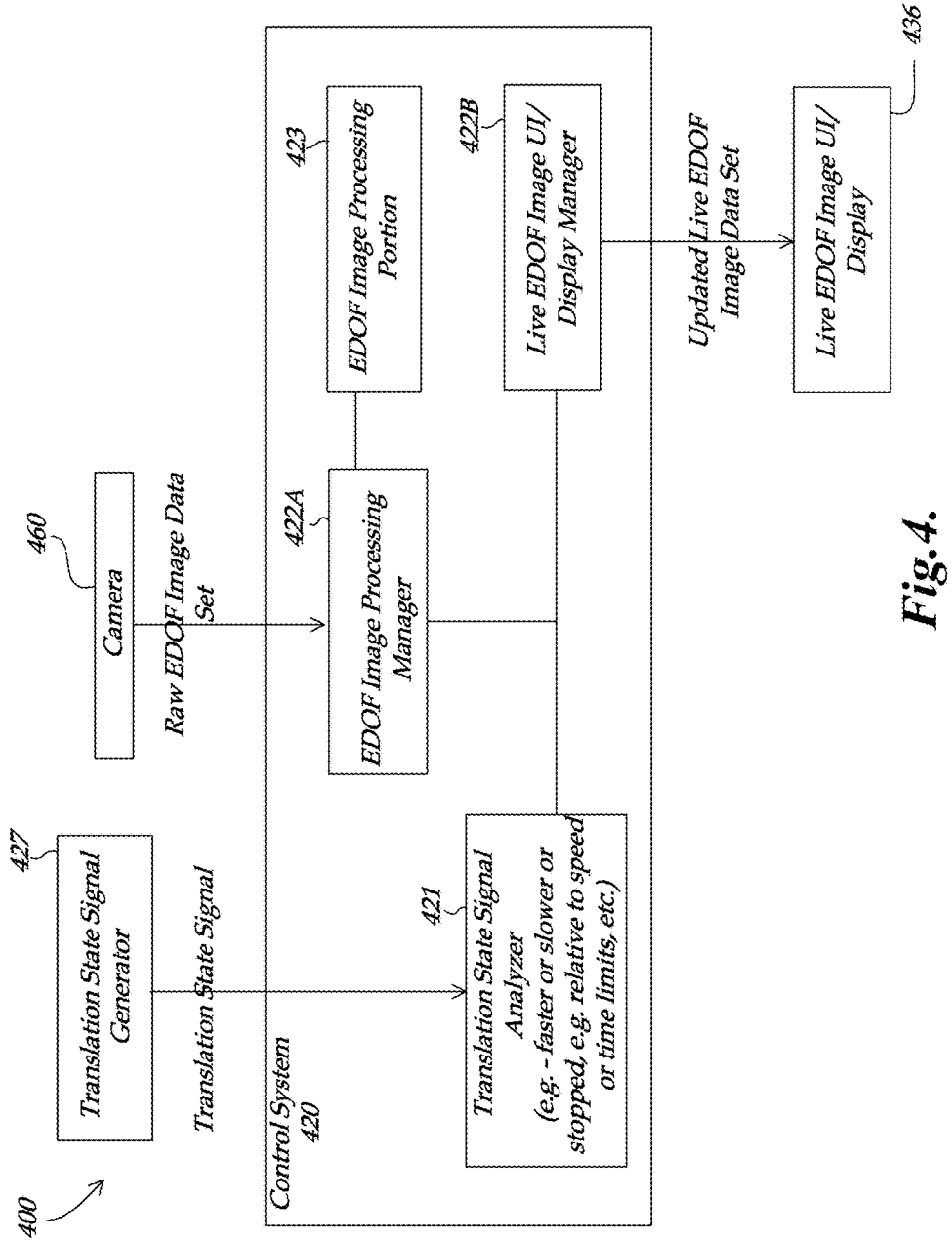
FIG. 4 is a block diagram of components utilized in a first implementation of a control system of a vision system for providing a live EDOF image.

FIG. 4 is a block diagram of components utilized in a first implementation of a control system 420 of a vision system 400 for providing a live EDOF image. As shown in FIG. 4, the vision system 400 includes the control system 420, a translation state signal generator 427, a live EDOF image UI/display 436, and a camera 460. The control system 420 includes a translation state signal analyzer 421, an EDOF image processing manager 422A, a live EDOF image UI/display manager 422B, and an EDOF image processing portion 423. As will be described in more detail below, in certain instances EDOF image processing (e.g., as performed by the live EDOF image processing portion 423) may become relatively slow for certain images (e.g., high-resolution), resulting in low frame/video rates for the repetitively provided live EDOF images in the user interface 436. In accordance with principles disclosed herein, an automatic adaptive EDOF image processing may be utilized to improve user experience.

For example, when a translation speed (e.g., of a workpiece across a field of view of the imaging system) is relatively slow, a live EDOF image produced with high resolution (e.g., full resolution) EDOF image processing may be displayed which corresponds to high EDOF image quality. When a translation speed is relatively faster (e.g., corresponding to faster movement of a workpiece across a field of view of an imaging system), a live EDOF image produced by lower EDOF image processing (or no EDOF image processing) may be displayed, resulting in a higher frame rate (e.g., for the repetitively provided live EDOF images in the user interface 436) but of lower EDOF image quality. In various implementations, such lower EDOF image quality may be regarded as being acceptable due to a user's inability to perceive minute details under conditions where there is a high translation speed (e.g., for which motion blur and/or other distractions, etc., may occur in the updated video display in the user interface 436). It will be appreciated that such "motion blur" is different from "defocus blur," in that motion blur generally results from a translation in the x- and/or y-axis directions relative to the field of view of the imaging system, while defocus blur is related to focusing in the z-axis direction in relation to workpiece features having different Z-heights and the TAG lens 370 modulating the focus distance throughout the image exposure.

In the configuration of FIG. 4 for providing a live EDOF image, the camera 460 is configured to input workpiece image light from a lens system (e.g., see FIG. 3) at a plurality of focus distances for the imaging system and to output a corresponding raw EDOF image data set corresponding to a raw EDOF image (e.g., which may include defocus blur), wherein the raw EDOF image data set is provided to the EDOF image processing manager 422A. The EDOF image processing portion 423 is configured to input the raw EDOF image data set from the EDOF image processing manager 422A, and to process the raw EDOF image data set to provide a processed EDOF image data set that is based on image processing to remove defocus blur in a corresponding processed EDOF image that may be displayed in the user interface 436.

The display manager 422B may receive both the raw EDOF image data set and the processed EDOF image data set from the EDOF image processing manager 422A, and determine what EDOF image data set to provide as the updated live EDOF image data set to the user interface 436. More specifically, in the example of FIG. 4, upon receiving the raw EDOF image data set, the EDOF image processing portion 423 may begin the image processing at a relatively high resolution level (e.g., at a full resolution) with the processed EDOF image data set being passed through the processing manager 422A to the display manager 422B when the image processing is complete. The display manager 422B may utilize a signal from the translation state signal analyzer 421 to determine whether to utilize the repetitively provided raw EDOF image data sets that are being provided at a relatively higher update rate, or to utilize the repetitively provided processed EDOF image data sets that are being provided at a relatively lower update rate, for display in the user interface 436.

In one implementation, this process may include the display manager 422B using the signal from the translation state signal analyzer 421 to determine whether to utilize a raw EDOF image data set that is immediately available, or to wait a brief period of time for a processed EDOF image data set to be received once the image processing by the EDOF image processing portion 423 is complete. It will be appreciated that in either case, the selected data set is provided as a live EDOF image data set for displaying a live EDOF image in the user interface 436, in that any processing is completed quickly enough for the image to be displayed at least approximately in real time relative to when the raw EDOF image data set was acquired. In various implementations, the display manager 422B may also have an option for reusing a previous image (e.g., if the translation state signal analyzer indicates that the state is "stopped"), as corresponding to no current movement of the workpiece across the field of view of the imaging system at a current time.

In various implementations, the translation state signal analyzer 421 may analyze a translation state signal from the translation state generator 427 as corresponding to a current translation speed of the workpiece across the field of view of the imaging system at a current time (e.g., indicating if the current translation speed is faster, slower, stopped, etc.) as may be determined relative to certain speed or time limits or other thresholds, etc. During operation of the vision system 400, the translation state signal is repetitively determined. In various implementations, different types of signals, analysis, etc., may be utilized for determining the translation state signal. For example, a speed of movement of a stage of the imaging system on which the workpiece is located may be determined (e.g., according to a control signal for the stage, or according to an encoder output signal indicating a speed of motion, etc.). In various implementations, such motion control speeds may be determined in combination with a magnification level. More specifically, depending on a current magnification level, the translation speed of the workpiece across the field of view of the imaging system may be relatively faster or slower (e.g., at a 2x magnification level the translation speed across a field of view may be approximately 2x higher than at a 1x magnification level for a given amount of stage movement, etc.)

As another example, the determining of the translation state signal may include analyzing sequential images to determine an amount of translation (e.g., of at least one feature in the images, etc.). In one such implementation, a difference may be computed between a current image and a stored previous image or stored previous image statistics (e.g., a histogram). In various implementations, the differences between images may be determined according to various techniques. For example, an average absolute pixel difference may be determined (e.g., a sum of absolute pixel differences divided by an image size in terms of the number of pixels). As another example, an average absolute pixel difference normalized by an average gray scale of the two images may be determined (e.g., to reduce brightness dependency of the corresponding metric). As another example, a similarity of histograms of the two images may be determined (e.g., computed as cosine between two vectors, where both histograms are treated as N-dimensional vectors). As another example, an absolute difference between average gray scales of two images may be determined, although in some instances such techniques may require a further determination as to whether the calculation is sensitive enough in certain configurations to detect small amounts of motion, etc. As another example, an optical flow estimation technique may be used to determine the motion (displacement) vectors between the consecutive EDOF images.

In various implementations, with respect to the signal received from the translation state signal analyzer 421, a speed-related threshold may be utilized for determining if the display manager 422B will output the raw EDOF image data set or the processed EDOF image data set as the updated live EDOF image data set to the user interface 436. For example, the speed-related threshold may correspond to a specific translation speed, wherein if the current translation speed is above the speed-related threshold, the display manager 422B may utilize the raw EDOF image data set, or if the current translation speed is below the speed-related threshold, the display manager 422B may utilize the processed EDOF image data set, or if the current translation speed is zero (e.g., corresponding to a "stopped" state), a previous EDOF image may be reutilized. In an alternative configuration, in addition to the option for utilizing the raw EDOF image data set, a lower level of image processing may also be available that removes defocus blur at a lower level of resolution. For example, the EDOF image processing portion 423 may perform image processing alternatively for a full level of resolution, or a lower level of resolution. Such lower level resolution image processing will be described in more detail below with respect to FIG. 5.

Figure 5:
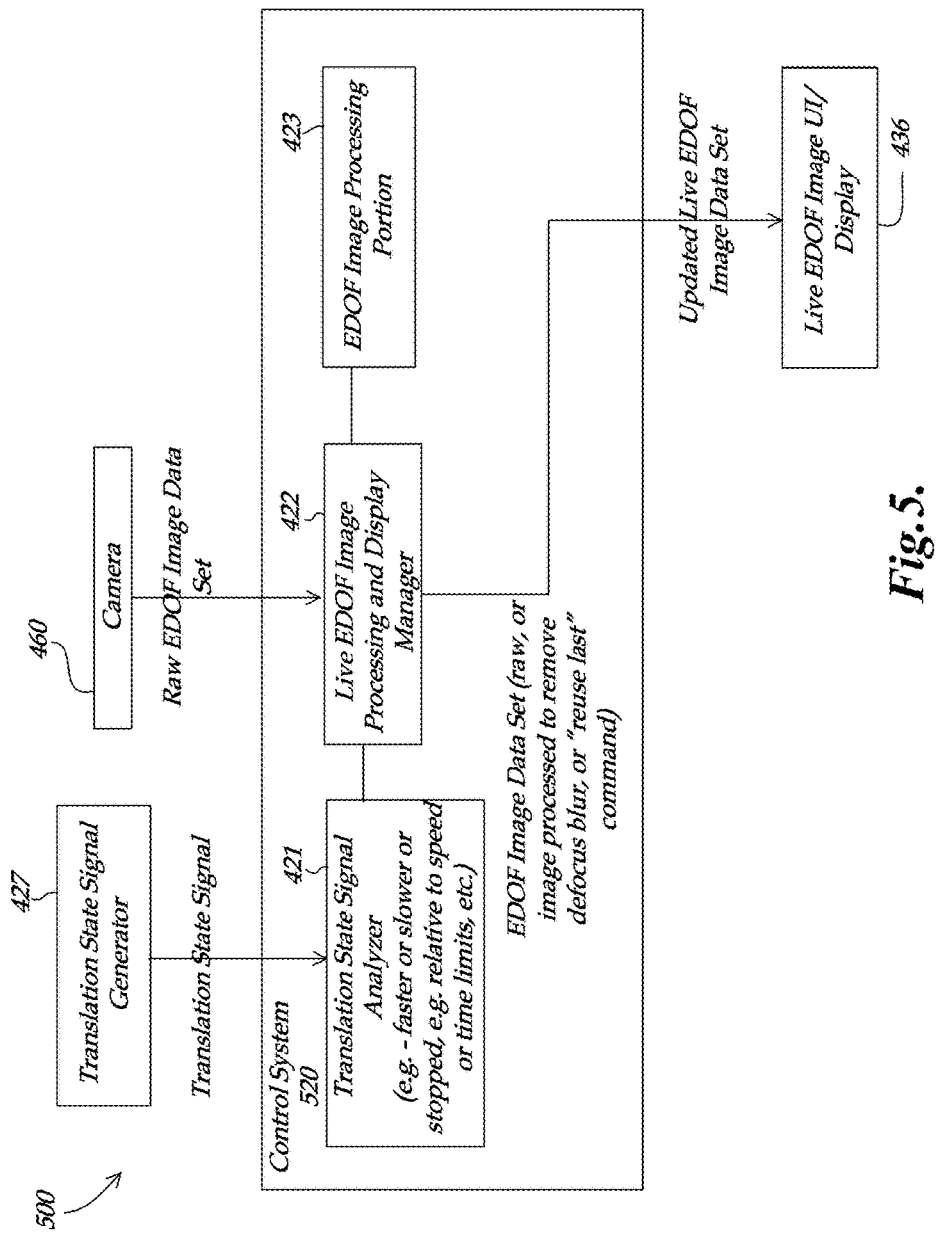
FIG. 5 is a block diagram of components utilized in a second implementation of a control system of a vision system for providing a live EDOF image.

FIG. 5 is a block diagram of components utilized in a second implementation of a control system 520 of a vision system 500 for providing a live EDOF image. The vision system 500 has certain similarities to the vision system 400 of FIG. 4, and similarly numbered components will be understood to operate similarly, except as otherwise described below. As shown in FIG. 5, the vision system 500 includes a control system 520, the translation state signal generator 427, the live EDOF image UI/display 436 and the camera 460. The control system 520 includes the translation state signal analyzer 421, a live EDOF image processing and display manager 422, and an EDOF image processing portion 423. One difference of the vision system 500, is that the live EDOF image processing and display manager 422 performs certain combined functions of the EDOF image processing manager 422A and the live EDOF image UI/display manager 422B of FIG. 4, as will be described in more detail below.

In the example of FIG. 5, the live EDOF image processing and display manager 422 may conditionally perform processing at different resolution levels depending on the output from the translation state signal analyzer 421. More specifically, in response to a translation state signal corresponding to a relatively slow current translation speed, a relatively high level of image processing may be performed by the image processing portion 423 to remove defocus blur. In contrast, in response to a translation state signal corresponding to a relatively faster current translation speed, relatively less image processing may be performed by the image processing portion 423 to remove defocus blur. In one implementation, such processes are performed through automatic adaptive EDOF image resizing that reduces the resolution of processed EDOF images based on the translation state signal. In such an implementation, when there is a relatively high current translation speed, the EDOF images may be processed at a reduced resolution, resulting in faster processing and the processed EDOF image data sets being produced more quickly by the EDOF image processing portion 423 as corresponding to a higher video frame rate for the user interface 436. In contrast, when the current translation speed is relatively slow, the EDOF images may be processed by the EDOF image processing portion 423 at a higher resolution (e.g., at a full resolution), resulting in slower overall processing time and a lower frame rate but with higher EDOF image quality for the user interface 436.

In one implementation, the reduction in resolution may be achieved by reducing the number of pixels or kernels that are processed for a current image. For example, for an image with a specified number of pixels (e.g., 640×480), the total number of pixels to be processed may be reduced by combining data from the pixels (e.g., by combining data from each square group of four pixels into a multi-pixel kernel). In accordance with such combining, a 640×480 array of pixels may be reduced to 320×240 kernels. The EDOF processing performed by the EDOF image processing portion 423 may then be performed at the reduced resolution for the 320×240 kernels. The live EDOF image processing and display manager 422 may then resize the EDOF image data set back to the original dimensions (e.g., from 320×240 to 640×480) for sending to the user interface 436.

In various implementations, a buffer of a specified length may be utilized for storing data such as previous images, previous corresponding histograms or other relevant image statistics. Such data may be utilized for analysis of image difference history and other factors (e.g., by the translation state signal analyzer 421) to determine if the current translation speed is significant or not and/or to make a resolution switch insensitive to certain types of events. For example, upon analysis of the translation state signal based on a buffer of stored images or image statistics, a determination may be made to switch processing resolution only when the translation speed changes (e.g., when the camera motion starts or stops, etc.). In addition, an input may be received from a user to control and/or otherwise set a speed-related threshold to make the high-resolution to low-resolution switching more or less sensitive to motion or other inter-frame changes (e.g., image brightness), depending on the particular applications and preferences of the user. In various implementations, a typical inter-frame difference for stationary images may be determined to establish an effective frame difference decision threshold for a specific setup (e.g., the threshold may depend at least in part on camera noise, lighting levels, etc.)

In various implementations, the above described techniques may also be applied to particular regions of interest in a given image. For example, the above described processing for EDOF images from a megapixel camera may be relatively slow with respect to video-rate display in a user interface. In order to provide sufficiently fast response for live EDOF image processing (e.g., at least approximately in real time) for video frames from a megapixel camera, a particular region of interest of the EDOF image may be selected for high resolution processing. In one example implementation, only the selected region of interest (e.g., as selected by a user) may be processed, and may be surrounded by unprocessed raw EDOF image portions. When combined with region of interest-based fast frame capture of certain cameras, such techniques may be utilized for achieving fast processing with reduced noise, since one or more camera-captured regions of interest (e.g., captured at a frame rate higher than the full-frame rate) may be averaged before each EDOF processing to reduce noise in the processed EDOF image. In this example implementation, an EDOF-processed region of interest can in certain configurations be surrounded either by black pixels or by portions of a raw EDOF image captured immediately before a camera was switched from a full-frame capture mode to a region of interest capture mode.

In various implementations, the control system 420 or 520 may be included as part of an imaging system (e.g., the imaging system 300 of FIG. 3, etc.) As described above with respect to FIG. 3, such an imaging system may include a lens system with a TAG lens 370 that is controlled by a lens controller 371 to provide a periodically modulated optical power variation for the TAG lens and thereby provide a corresponding focus distance variation for the imaging system 300. A camera 360/460 of the imaging system is configured to input workpiece image light from the lens system at a plurality of focus distances for the imaging system (e.g., within a range R) and to output a corresponding raw EDOF image data set corresponding to a raw EDOF image. With respect to FIGS. 4 and 5, an image processing portion 423 of the imaging system is configured to input a raw EDOF image data set and process it to provide an EDOF image data set that is based on image processing to remove defocus blur in a corresponding displayed EDOF image provided in the user interface 436.

In various implementations, the camera 460 may be operated to output a sequence of the raw EDOF image data sets over time, corresponding to a sequence of raw EDOF images of the workpiece over time. The translation state signal generator 427 and translation state signal analyzer 421 are utilized to repetitively determine a translation state signal corresponding to a current translation speed of the workpiece 320 across a field of view of the imaging system at a current time. The live EDOF image of the workpiece displayed in the user interface 436 is repetitively updated based on the state of the translation state signal at a current time, for which different types of EDOF images are displayed depending on the state of the translation state signal.

More specifically, in response to a first translation state signal from the translation state signal generator 427 corresponding to a first current translation speed (e.g., a relatively slower translation speed that is determined to be below a designated speed-related threshold), the display manager 422B or the image processing and display manager 422 operates to cause a first type of live EDOF image of the workpiece to be displayed in the user interface 436. The first type of live EDOF image corresponds to an EDOF image data set that is based on a first level of image processing (e.g., a full or relatively high amount of image processing) by the EDOF image processing portion 423 to remove defocus blur in the first type of live EDOF image. In response to a second translation state signal corresponding to a second current translation speed that is faster than the first current translation speed (e.g., as determined as being above a first designated speed-related threshold), the display manager 422B or the image processing and display manager 422 operates to cause a second type of live EDOF image of the workpiece to be displayed in the user interface 436.

In various implementations, the second type of live EDOF image may correspond to an EDOF image data set that is based on at least one of: a second level of image processing by the EDOF image processing portion 423 to remove defocus blur in the second type of live EDOF image, wherein the second level of image processing corresponds to less image processing than the first level of image processing; or no image processing to remove defocus blur in the second type of live EDOF image (e.g., wherein the raw EDOF image data set from the camera 460 may be passed through to the user interface 436). In various implementations, repetitively updating the live EDOF image may further include, in response to a third translation state signal corresponding to a third current translation speed that is faster than the second current translation speed (e.g., as determined as being above a second designated speed-related threshold), displaying a third type of live EDOF image of the workpiece in the user interface (e.g., corresponding to an EDOF image data set that is based on a third level of image processing that corresponds to less image processing than the second level of image processing or no image processing to remove defocus blur in the third type of live EDOF image). It will be appreciated that in various implementations, additional levels of image processing may similarly be utilized with respect to additional speed-related thresholds.

In various implementations, the control systems 420 or 520 may also include additional elements, such as an illumination controller that allows strobe illumination to be synchronized with the TAG lens optical power variation. As another example, an exposure controller for the camera 460 may also be included, to synchronize camera "shutter function" exposure sub-increments of the camera with the TAG lens optical power variation. Such functionality may be utilized to replace or augment the ability of strobe illumination (e.g., from light source 330) to provide exposure sub-increments during an exposure. In certain instances, the translation state signal generator may also be included in the control systems 420 and 520.

Figure 6:
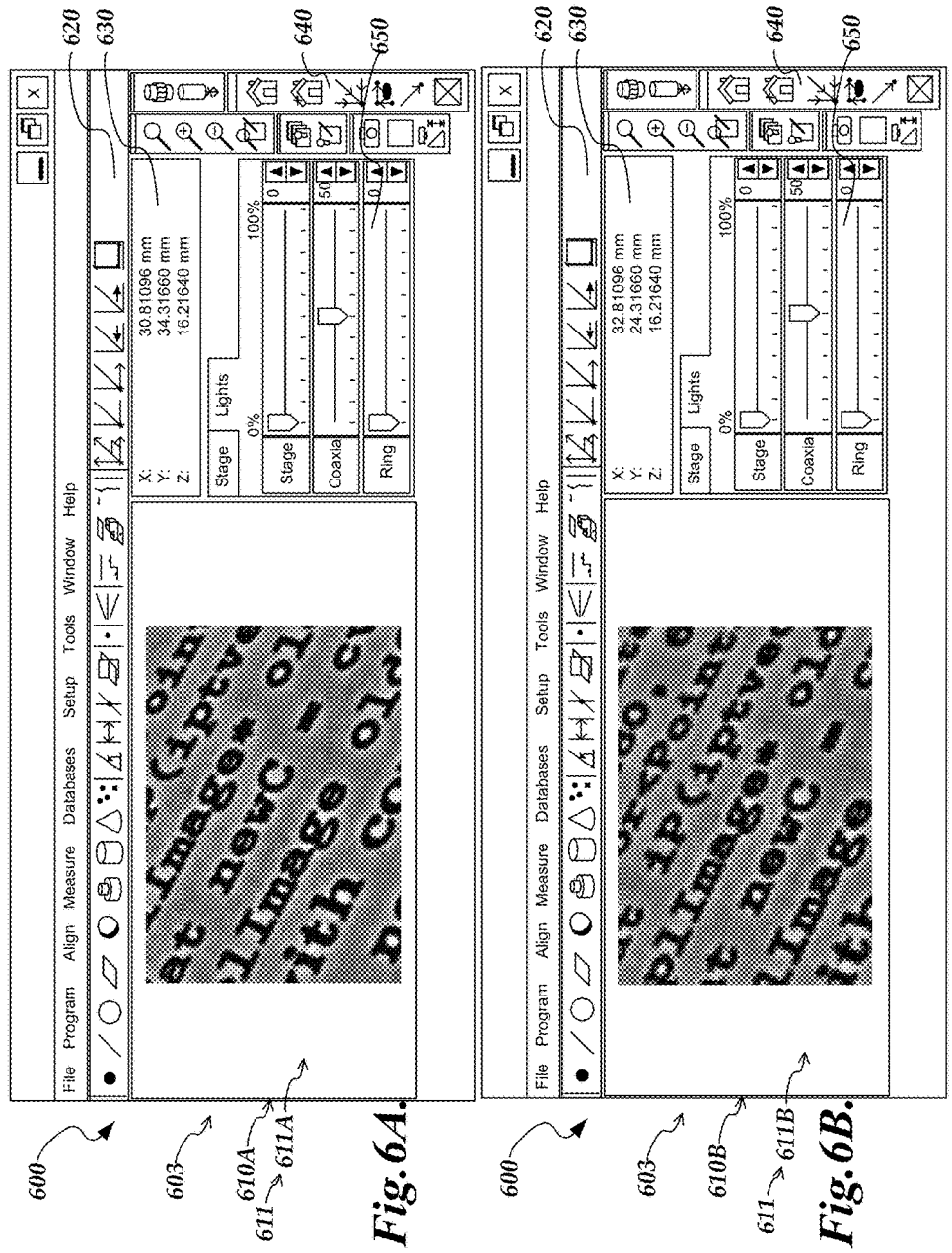
FIG. 6A is a diagram illustrating a user interface associated with an imaging system in which a first level of image processing has been utilized to remove defocus blur at a first level of resolution in a displayed first type of live EDOF image.
FIG. 6B is a diagram illustrating the user interface of FIG. 6A in which a second level of image processing has been utilized to remove defocus blur at a second level of resolution in a displayed second type of live EDOF image.

FIGS. 6A and 6B are diagrams illustrating a user interface 600 associated with an imaging system. As will be described in more detail below, in the example of FIG. 6A, a first level of image processing has been utilized to remove defocus blur at a first level of resolution in a displayed first type of live EDOF image 610A. In the exemplary state shown in FIG. 6A, the user interface 600 includes a field of view window 603 that displays the first type of live EDOF image 610A of a workpiece portion 611A of a workpiece 611 (e.g., with a surface including various letters and symbols, such as the word "newC" in a middle area). In one implementation, the surface of the workpiece on which the letters are located may be tilted, such that different letters and symbols may be at different relative focus heights. It will be appreciated that in other examples, workpieces may include different features to be inspected which may be at different focus heights, as described in more detail in the incorporated references. The user interface 600 also includes various measurement and/or operation selection bars such as the selection bars 620 and 640, a real-time X-Y-Z (position) coordinate window 630, and a light control window 650.

As described above, the systems and methods disclosed herein with respect to an EDOF mode are particularly useful during learn mode and/or manual operations, in that a user may see (e.g., in the user interface 600) a video of live EDOF images (e.g., at least approximately in real time) while navigating a workpiece (e.g., workpiece 611) for visual inspection and/or workpiece program creation, during which the workpiece may translate across a field of view of the imaging system (e.g., as displayed within the field of view window 603). As an example of such translation, it can be seen that with respect to the field of view window 603 shown in FIG. 6B, the workpiece 611 has translated position relative to the field of view window 603 of FIG. 6A (e.g., wherein the word "newC" can be seen to have moved down and slightly to the left). Such movement/translation is also indicated by the real-time X-Y-Z (position) coordinate window 630, which shows a change in the X coordinate from 30.81096 mm to 32.81096 mm, and in the Y coordinate from 34.31706 mm to 24.31706 mm. In various implementations, the Z coordinate may remain the same as representing a stationary/middle-focus position relative to the modulated focus position provided by the VFL lens 370. It will be appreciated that by utilizing the EDOF mode during such translation movements for navigating across a workpiece, the user need not continually refocus images depending on the height of various microscopic features on the workpiece, which can be tedious and time-consuming (e.g., especially at high magnifications, etc.).

In the example of FIG. 6A, at a current time the user navigation of the workpiece 611 is currently moving at a relatively slow speed, such that a first translation state signal (e.g., as described above) corresponds to a first current translation speed (e.g., a relatively slower speed). In response to the relatively slow translation speed, the first type of live EDOF image 610A of the workpiece 611 is displayed in the user interface 600 corresponding to an EDOF image data set that is based on a first level of image processing (e.g., a relatively high amount of image processing) to remove defocus blur in the first type of live EDOF image 610A.

In contrast, in the example of FIG. 6B, at a current time the user navigation of the workpiece 611 is currently moving at a relatively faster speed (e.g., the user is causing the stage of the vision system to move faster for scanning across the workpiece), such that a second translation state signal corresponds to a second current translation speed (e.g., a relatively faster speed). In response to the relatively faster translation speed, a second type of live EDOF image 610B of a workpiece portion 611B of the workpiece 611 is displayed in the user interface 600. In various implementations, the second type of live EDOF image corresponds to an EDOF image data set that is based on a second level of image processing to remove defocus blur in the second type of live EDOF image 610B, wherein the second level of image processing corresponds to less image processing than the first level of image processing. In various implementations, the first level of image processing may remove defocus blur at a first level of resolution in the first type of live EDOF image 610A, and the second level of image processing may remove defocus blur at a second level of resolution in the second type of live EDOF image 610B, wherein the second level of resolution is coarser (i.e., lower) than the first level of resolution. In the examples of FIGS. 6A and 6B, the "coarser" level of resolution for the live EDOF image 610B is visible as compared to the live EDOF image 610A.

Figure 7:
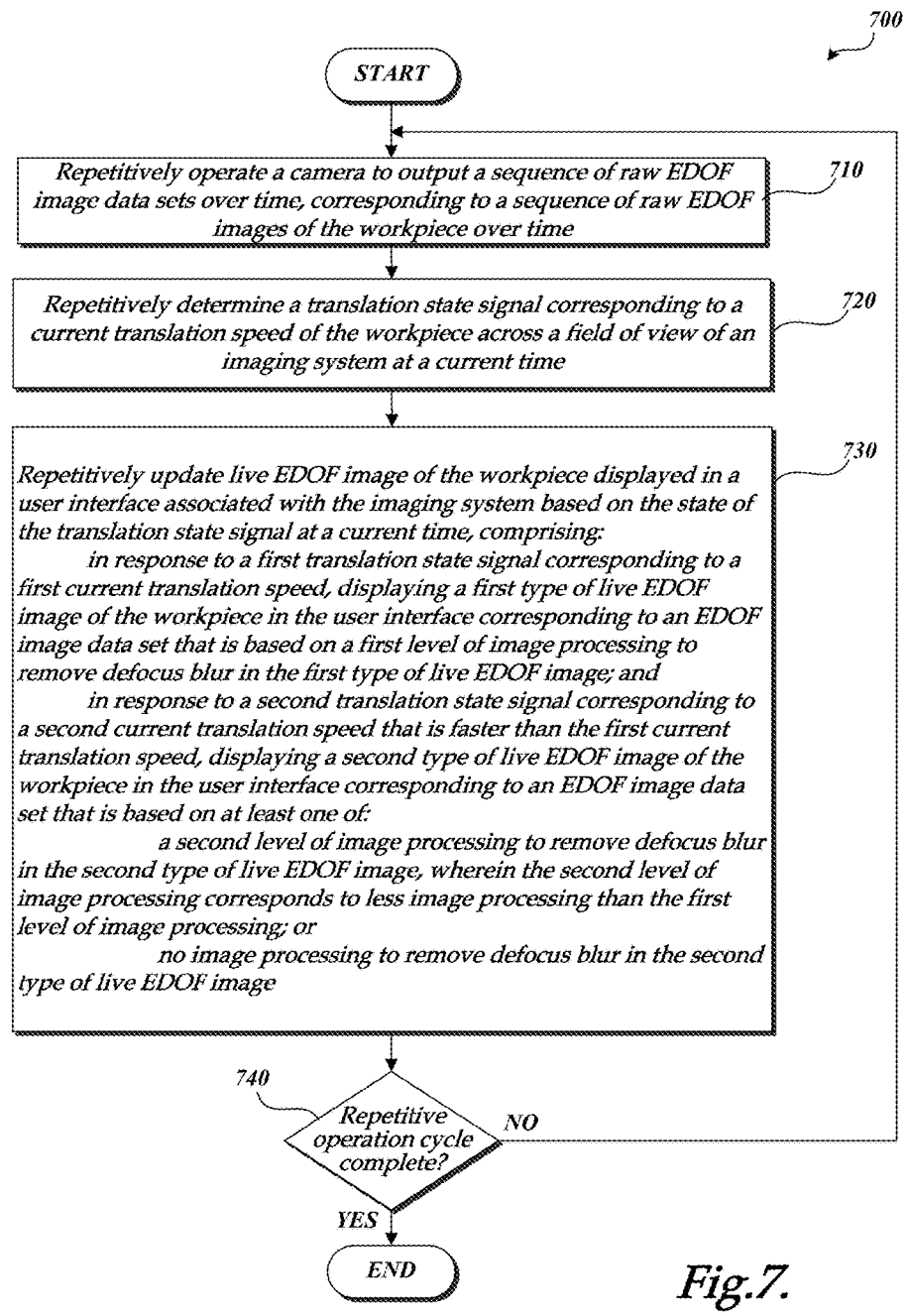
FIG. 7 is a flow diagram illustrating one exemplary implementation of a routine for providing a live EDOF image of a workpiece displayed in a user interface associated with an imaging system.

FIG. 7 is a flow diagram illustrating one exemplary implementation of a routine 700 for providing a live EDOF image of a workpiece displayed in a user interface associated with an imaging system. At a block 710, a camera is repetitively operated to output a sequence of raw EDOF image data sets over time, corresponding to a sequence of raw EDOF images of a workpiece over time. At a block 720, a translation state signal is repetitively determined corresponding to a current translation speed of the workpiece across a field of view of an imaging system at a current time. It will be appreciated that "translation speed" refers to any relative motion between the workpiece and the field of view, regardless of its cause. Motion of a component of the imaging system or motion of the workpiece, or both, may cause the relative motion. In various implementations, the determining of the translation state signal at block 720 may include at least one of: determining a motion control speed (e.g., in combination with a magnification level); determining a speed of movement of a stage of the imaging system on which the workpiece is located (e.g., in combination with a magnification level); analyzing sequential images to determine an amount of difference between the images; or analyzing sequential images to determine an amount of translation of at least one feature in the images.

At a block 730, a live EDOF image of the workpiece displayed in a user interface associated with the imaging system is repetitively updated based on the state of the translation state signal at a current time. The repetitive updating of the live display in the user interface comprises operations wherein:

in response to a first translation state signal corresponding to a first current translation speed, a first type of live EDOF image of the workpiece is displayed in the user interface. The first type of live image corresponds to an EDOF image data set that is based on a first level of image processing to remove defocus blur in the first type of live EDOF image; and in response to a second translation state signal corresponding to a second current translation speed that is faster than the first current translation speed, a second type of live EDOF image of the workpiece is displayed in the user interface. The second type of live image corresponds to an EDOF image data set that is based on at least one of: a) a second level of image processing to remove defocus blur in the second type of live EDOF image, wherein the second level of image processing corresponds to less image processing than the first level of image processing; or, b) no image processing to remove defocus blur in the second type of live EDOF image.

At a decision block 740, a determination is made as to whether the repetitive operations of the routine are complete (e.g., due to stopping an EDOF imaging mode in order to use a conventional imaging mode in an inspection system). If the repetitive operations are not complete, the routine continues, and if the repetitive operations are complete, the routine ends.

In one implementation that is exemplary, but not limiting, the operations of block 730 may include assessment of a current translation state signal, followed by operations that depend on the outcome of that assessment (e.g. as described further below.)

In some implementations, the current translation state signal may be a translation speed that is directly or indirectly determined (e.g., according to a commanded motion speed, or a feature translation between first and second consecutive images, or any one of the other translation speed or translation rate of change indicators disclosed herein). Alternatively, the current translation speed may be reflected from any other image or "image change" metric which is correlated to translation speed. In either case, the translation speed or speed-related metric is compared to an appropriate predetermined threshold level. The next updating of the live EDOF image may then be performed based at least in part on this determination (e.g., as follows).

In various implementations, in response to a first translation state signal that is assessed or determined to be below the speed-related threshold, a first type of live EDOF image of the workpiece is displayed in the user interface corresponding to an EDOF image data set that is based on a first level of image processing to remove defocus blur in the first type of live EDOF image. In some embodiments the first level of image processing may be relatively extensive, and/or provide the best possible EDOF image. In other embodiments, the first level of image processing may be selected to produce a "good enough" image that is acceptable to various users.

In contrast, in response to a second translation state signal that is assessed or determined to be above the speed-related threshold, a second type of live EDOF image of the workpiece is displayed in the user interface, corresponding to an EDOF image data set that is based on at least one of: a second level of image processing to remove defocus blur in the second type of live EDOF image, wherein the second level of image processing corresponds to less image processing (and/or a shorter processing time) than the first level of image processing; or no image processing to remove defocus blur in the second type of live EDOF image.

It will be appreciated that in various implementations additional levels of image processing may similarly be performed with respect to additional speed-related thresholds. In various implementations, input may be received from a user which defines one or more speed-related thresholds, and the steps for repetitively updating the live EDOF image may be performed automatically according to the user defined speed-related threshold(s).

In various implementations, the second type of live EDOF image may be a raw EDOF image corresponding to a raw EDOF image data set, wherein the EDOF image data set is based on no image processing to remove defocus blur from the raw EDOF image used in the second type of live EDOF image. In some implementations, the first level of image processing may remove defocus blur at a first level of resolution in the first type of live EDOF image, and the second level of image processing of block 730 may remove defocus blur at a second level of resolution in the second type of live EDOF image, wherein the second level of resolution is coarser (i.e., lower) than the first level of resolution. In various implementations, any level of image processing that removes defocus blur may comprise deconvolution processing of the raw EDOF data set based on a predetermined integrated point spread function that characterizes operation of the lens system.

In one specific example implementation, a first level of resolution associated with the first level of image processing may be a full pixel-level resolution corresponding to the resolution of the raw EDOF image data set. The second level of image processing that removes defocus blur at the second level of resolution may be configured to process the raw EDOF image data to define a corresponding set of multi-pixel kernels. The pixel-level data of each multi-pixel kernel may be averaged or otherwise combined to provide a reduced amount of multi-pixel kernel level data that characterizes each multi-pixel kernel, and the multi-pixel kernel level data may be processed to remove defocus blur at a level of resolution corresponding to the size of the multi-pixel kernels in the second type of live EDOF image. In various implementations, the multi-pixel kernel operations may also or alternatively include various alternative types of "pixel binning" operations as part of the second level of image processing.

In various implementations, the repetitive steps of the method 700 may be performed at a rate such that the live EDOF image of a workpiece displayed in the user interface is repetitively updated at least a minimum number of times per second (e.g., 10 times, 25 times, etc.), at least during operating states corresponding to the second translation state signal. In various implementations, the method 700 may further include determining if the translation state signal corresponds to a state of no translation, in which case the step of repetitively updating the live EDOF image of a workpiece displayed in the user interface may be suspended or the same live EDOF image may be repeated, until the translation state signal again corresponds to a state of translation.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A method for providing a live extended depth of field (EDOF) image of a workpiece displayed in a user interface associated with an imaging system, wherein the workpiece may translate across a field of view of the imaging system, the imaging system comprising:
   a lens system including a tunable acoustic gradient (TAG) lens that is controlled to provide a periodically modulated optical power variation for the TAG lens and thereby provide a corresponding focus distance variation for the imaging system;
   a control system comprising a lens controller configured to control the TAG lens;
   a camera configured to input workpiece image light from the lens system at a plurality of focus distances for the imaging system and output a corresponding raw EDOF image data set corresponding to a raw EDOF image; and
   an image processing portion configured to input a raw EDOF image data set and process it to provide an EDOF image data set that is based on image processing to remove defocus blur in a corresponding displayed EDOF image,
   the method comprising:
   repetitively operating the camera to output a sequence of the raw EDOF image data sets over time, corresponding to a sequence of raw EDOF images of the workpiece over time;
   repetitively determining a translation state signal corresponding to a current translation speed of the workpiece across a field of view of the imaging system at a current time;
   repetitively updating the live EDOF image of the workpiece displayed in the user interface based on a state of the translation state signal at a current time, wherein the repetitively updating the live EDOF image comprises:
      in response to a first translation state signal corresponding to a first current translation speed, displaying a first type of live EDOF image of the workpiece in the user interface corresponding to an EDOF image data set that is based on a first level of image processing to remove defocus blur in the first type of live EDOF image; and
      in response to a second translation state signal corresponding to a second current translation speed that is faster than the first current translation speed, displaying a second type of live EDOF image of the workpiece in the user interface corresponding to an EDOF image data set that is based on at least one of:
         a second level of image processing to remove defocus blur in the second type of live EDOF image, wherein the second level of image processing corresponds to less image processing than the first level of image processing; or
         no image processing to remove defocus blur in the second type of live EDOF image.

2. The method of claim 1, wherein the second type of live EDOF image is a raw EDOF image corresponding to a raw EDOF image data set, and wherein the EDOF image data set is based on no image processing to remove defocus blur from the raw EDOF image used in the second type of live EDOF image.

3. The method of claim 1, wherein:
   the first level of image processing removes defocus blur at a first level of resolution in the first type of live EDOF image; and
   the second level of image processing removes defocus blur at a second level of resolution in the second type of live EDOF image, wherein the second level of resolution is coarser than the first level of resolution.

4. The method of claim 3, wherein the image processing that removes defocus blur comprises deconvolution processing of the raw EDOF image data set based on a predetermined integrated point spread function that characterizes operation of the lens system.

5. The method of claim 3, wherein:
   the first level of resolution is a full pixel-level resolution corresponding to a resolution of the raw EDOF image data set.

6. The method of claim 5, wherein:
   the second type of live EDOF image corresponds to the EDOF image data set that is based on a second level of image processing that removes defocus blur at the second level of resolution in the second type of live EDOF image; and
   the second level of image processing that removes defocus blur at the second level of resolution is configured to:
      process the raw EDOF image data to define a corresponding set of multi-pixel kernels;
      at least one of average or combine pixel-level data of each multi-pixel kernel to provide a reduced amount of multi-pixel kernel level data that characterizes each multi-pixel kernel; and
      process the multi-pixel kernel level data to remove defocus blur at a level of resolution corresponding to a size of the multi-pixel kernels in the second type of live EDOF image.

7. The method of claim 3, wherein the repetitively updating the live EDOF image further comprises:
   in response to a third translation state signal corresponding to a third current translation speed that is faster than the second current translation speed, displaying a third type of live EDOF image of the workpiece in the user interface corresponding to an EDOF image data set that is based on no image processing to remove defocus blur in the third type of live EDOF image.

8. The method of claim 1, wherein the repetitive steps are performed at a rate such that the live EDOF image of a workpiece displayed in the user interface (UI) is repetitively updated at least 10 times per second, at least during operating states corresponding to the second translation state signal.

9. The method of claim 8, wherein the repetitive steps are performed at a rate such that the live EDOF image of a workpiece displayed in the user interface (UI) is repetitively updated at least 25 times per second, at least during operating states corresponding to the second translation state signal.

10. The method of claim 1, wherein:
the TAG lens is controlled to provide a periodically modulated optical power variation at a frequency of at least 3 KHz; and
the camera is configured to input workpiece image light from the lens system at a plurality of focus distances for the imaging system, during an exposure period spanning a plurality of periods of the periodically modulated optical power variation.

11. The method of claim 10, wherein the plurality of focus distances are configured to span at least 70% of a maximum focus range of the imaging system.

12. The method of claim 11, further comprising providing illumination having an intensity variation synchronized with the periodically modulated focus distance, such that a significant illumination intensity provides respective exposure contributions for focus distances within the at least 70% of the maximum focus range of the imaging system, and an insignificant illumination intensity suppresses exposure contributions for focus distances outside the at least 70% of the maximum focus range.

13. The method of claim 1, wherein the determining of the translation state signal comprises at least one of:
determining a motion control speed;
determining a motion control speed in combination with a magnification level;
determining a speed of movement of a stage of the imaging system on which the workpiece is located; or
analyzing sequential images to determine an amount of translation of at least one feature in the images.

14. The method of claim 1, wherein:
the displaying of the first type of live EDOF image is performed in response to a determination that at least one of the first translation state signal or the first current translation speed is below a speed-related threshold; and
the displaying of the second type of live EDOF image is performed in response to a determination that at least one of the second translation state signal or the second current translation speed is above the speed-related threshold.

15. The method of claim 14, further comprising receiving an input from a user which defines the speed-related threshold, and wherein the step of repetitively updating the live EDOF image is performed automatically according to the user defined speed-related threshold.

16. The method of claim 1, wherein the focus distance is periodically modulated over a plurality of focus distances spanning at least 20 times the depth of field of the imaging system at a single focus distance.

17. A vision system for providing a live extended depth of field (EDOF) image of a workpiece, the vision system comprising:
an imaging system, comprising:
a lens system including a tunable acoustic gradient (TAG) lens that is controlled to provide a periodically modulated optical power variation for the TAG lens and thereby provide a corresponding focus distance variation for the imaging system;
a control system comprising a lens controller configured to control the TAG lens;
a camera configured to input workpiece image light from the lens system at a plurality of focus distances for the imaging system and output a corresponding raw EDOF image data set corresponding to a raw EDOF image, wherein the camera is repetitively operated to output a sequence of the raw EDOF image data sets over time, corresponding to a sequence of raw EDOF images of the workpiece over time; and
an image processing portion configured to input and process a raw EDOF image data set to provide an EDOF image data set that is based on image processing to remove defocus blur in a corresponding displayed EDOF image;
a memory storing programmed instructions; and
one or more processors configured to execute the programmed instructions to perform operations including at least:
repetitively updating a live EDOF image of the workpiece displayed in a user interface based on a state of a translation state signal at a current time, the translation state signal corresponding to a current translation speed of the workpiece across a field of view of the imaging system at the current time, wherein the repetitively updating the live EDOF image comprises:
in response to a first translation state signal corresponding to a first current translation speed, displaying a first type of live EDOF image of the workpiece in the user interface corresponding to an EDOF image data set that is based on a first level of image processing to remove defocus blur in the first type of live EDOF image; and
in response to a second translation state signal corresponding to a second current translation speed that is faster than the first current translation speed, displaying a second type of live EDOF image of the workpiece in the user interface corresponding to an EDOF image data set that is based on at least one of:
a second level of image processing to remove defocus blur in the second type of live EDOF image, wherein the second level of image processing corresponds to less image processing than the first level of image processing; or
no image processing to remove defocus blur in the second type of live EDOF image.

18. The vision system of claim 17, wherein the second type of live EDOF image is a raw EDOF image corresponding to a raw EDOF image data set, and wherein the EDOF image data set is based on no image processing to remove defocus blur from the raw EDOF image used in the second type of live EDOF image.

19. The vision system of claim 17, wherein:
the first level of image processing removes defocus blur at a first level of resolution in the first type of live EDOF image; and
the second level of image processing removes defocus blur at a second level of resolution in the second type of live EDOF image, wherein the second level of resolution is coarser than the first level of resolution.

20. The vision system of claim 19, wherein the image processing that removes defocus blur comprises deconvolution processing of the raw EDOF data set based on a predetermined integrated point spread function that characterizes operation of the lens system.

* * * * *